J. R. LINDNER.
Corn Sheller.
No. 19,253.
Patented Feb. 2, 1858.
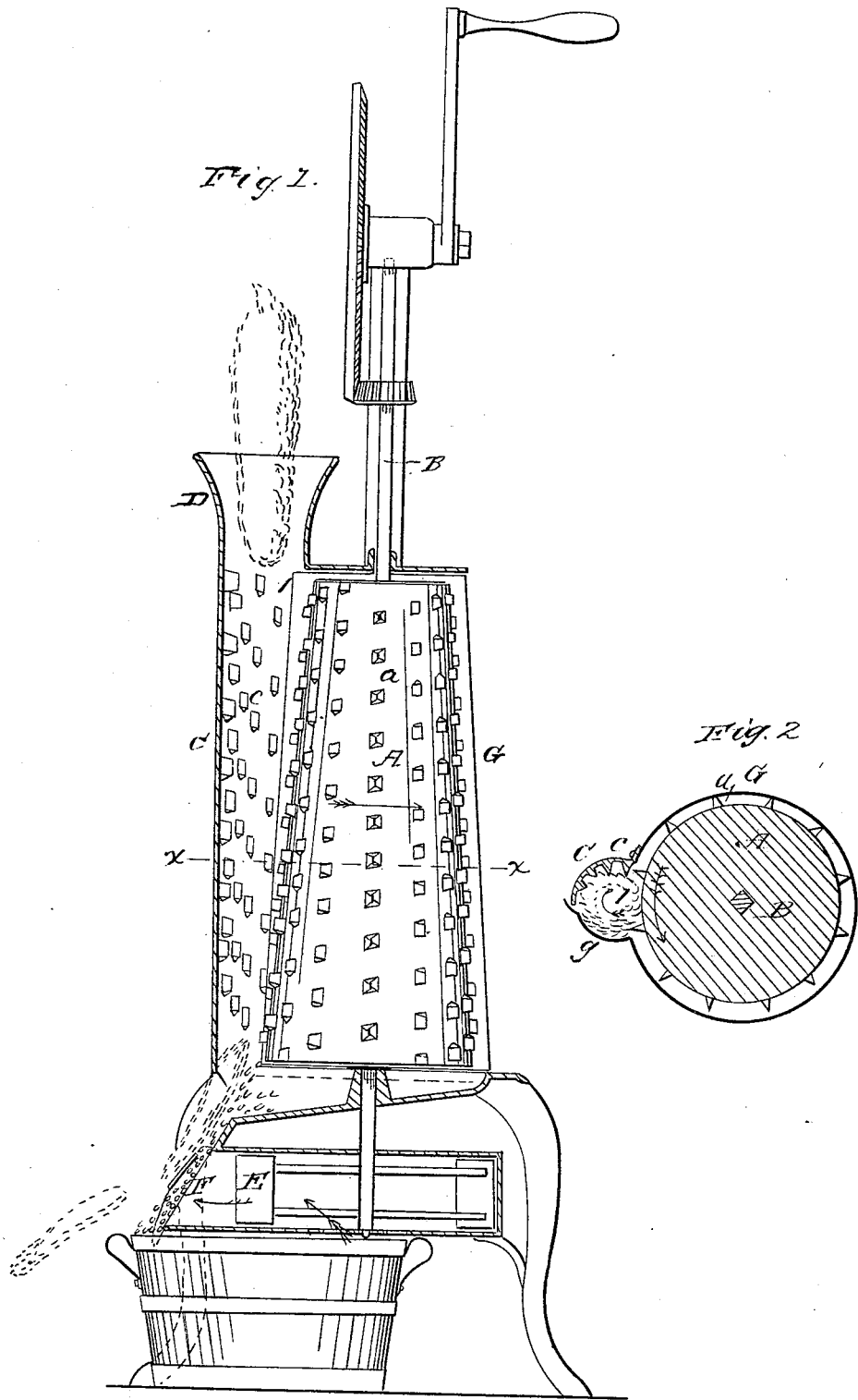

UNITED STATES PATENT OFFICE.

JOSEPH R. LINDNER, OF CINCINNATI, OHIO.

CORN-SHELLER.

Specification of Letters Patent No. 19,253, dated February 2, 1858.

*To all whom it may concern:*

Be it known that I, JOSEPH R. LINDNER, of Cincinnati, Hamilton county, Ohio, have invented a new and useful Improvement in Corn-Shellers; and I hereby declare the following to be a full, clear, and exact description thereof, reference being had to the annexed drawings, making part of this specification.

My invention consists in the construction and arrangement of an elastic case encircling the drum whereby efficient action is combined with simplicity and compactness.

In the accompanying drawings Figure 1 is an axial section—the drum being shown entire. Fig. 2 is a horizontal section at the line $x\ x$ Fig. 1.

A, is a drum having the form of a conic frustum and rotating upon a vertical shaft B.

$a$, are teeth arranged in both longitudinal and spiral rows on the drum.

C, is a cast iron concave having the form of a segment of an inverted conic frustum and armed with teeth $c$, also arranged in longitudinal and spiral rows. Attached to one edge of the concave C, is a steel or other elastic case G, which passing around nearly concentric with the drum A, is at its free edge enlarged into the form of a segmental frustum $g$, similar to the concave C, whose front edge it slightly overlaps, so that the concave C, enlargement $g$ and drum A, form together a passage 1, which contracts as it descends and presents a transverse section such as indicated in Fig. 2.

D is a hopper which conducts the ear into the passage 1.

E, is a fan fastened to the lower end of the shaft B, and serving to clean the corn during its escape down the perforated spout F.

The operation is as follows:—When the mill is at rest the portion of the enlargement $g$, which overlaps the edge of the concave C, is pressed with some force against the same by the elastic power of the case G. The drum being rotated in the direction of the arrow, an ear of corn dropped point downward through the hopper D into the passage 1 is at once turned briskly around (as indicated by the arrow), drawn downward and shelled by the action of the spirally arranged teeth $a$, the downward draft being promoted by the spiral arrangement of the teeth $c$, in the concave which also serve to hold the ear sufficiently to enable the teeth $a$, to completely remove the grain while the elasticity of the case G, causes ears of any size to be held against the drum A, and concave C, with a yielding pressure.

I claim as new and of my invention herein—

The elastic case G $g$, constructed as set forth in the described combination with the concave C $c$, and drum A $a$.

In testimony of which invention I hereunto set my hand.

JOSEPH R. LINDNER.

Attest:
 GEO. H. KNIGHT,
 JOHN H. PIATT.